3 Sheets—Sheet 1.
J. PRESTON, C. W. TENNIS & J. B. HAMILTON.
Seed-Planter.
No. 213,066. Patented Mar. 11, 1879.
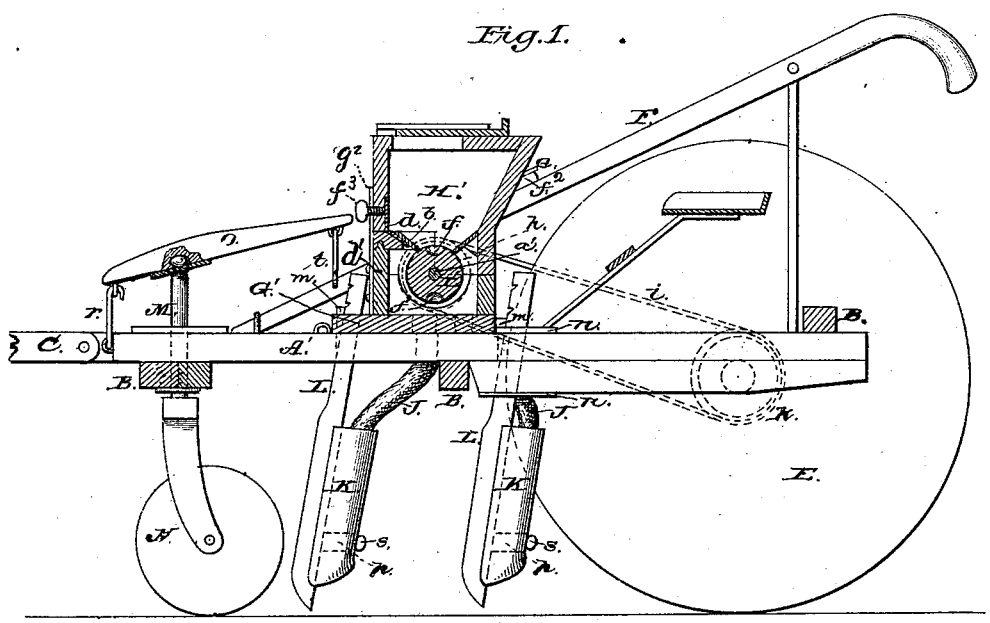
WITNESSES
INVENTORS
John Preston.
Chas. W. Tennis.
Joel B. Hamilton.
ATTORNEYS.

3 Sheets—Sheet 2.
J. PRESTON, C. W. TENNIS & J. B. HAMILTON.
Seed-Planter.
No. 213,066. Patented Mar. 11, 1879.
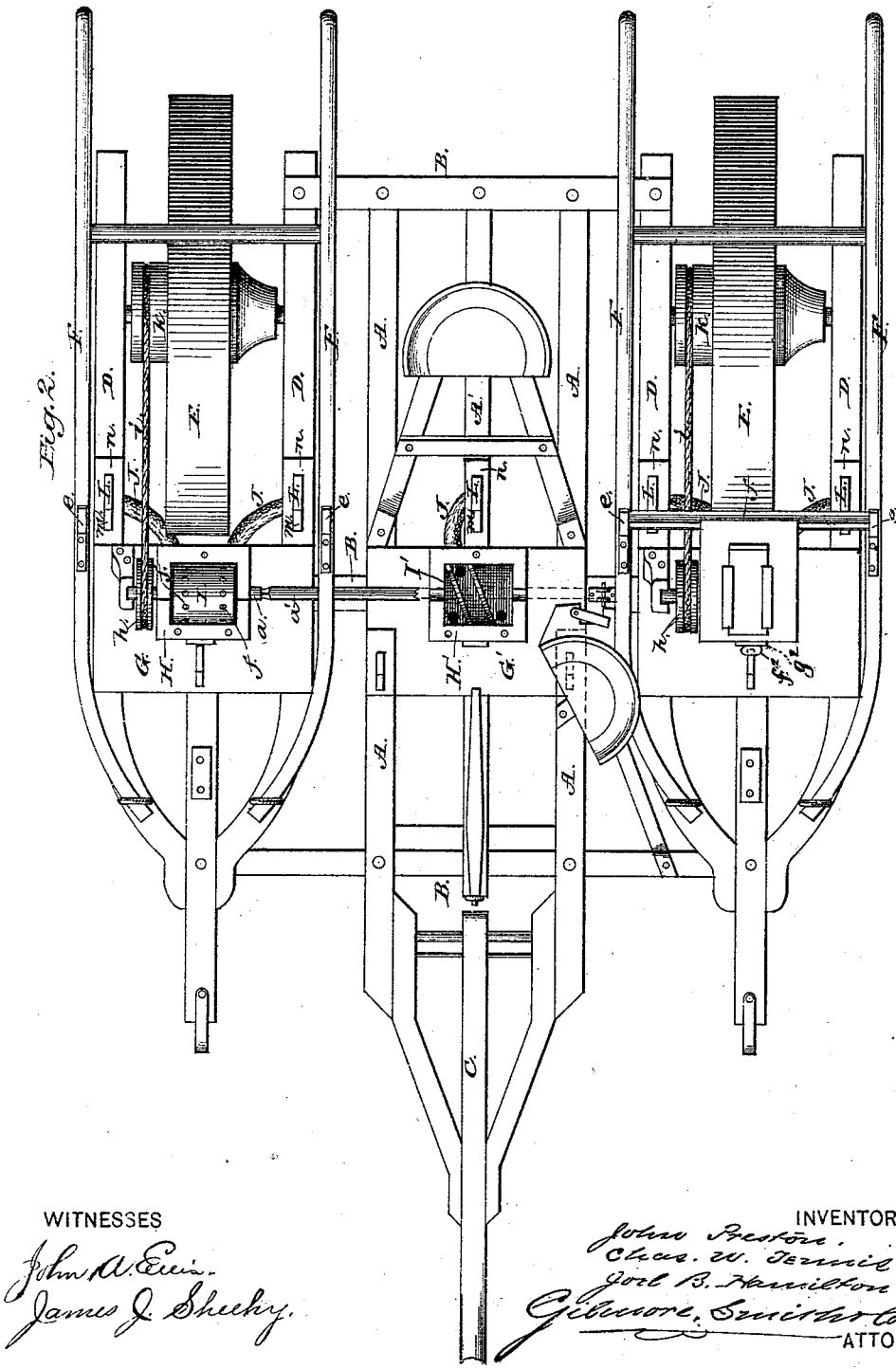
WITNESSES
INVENTORS.

3 Sheets—Sheet 3.

J. PRESTON, C. W. TENNIS & J. B. HAMILTON.
Seed-Planter.

No. 213,066. Patented Mar. 11, 1879.

WITNESSES
Robert Ewatt.
George E. Upham.

INVENTORS
John Preston.
Charles W. Tennis.
Joel B. Hamilton.
By Munn & Smith & Co.
ATTORNEYS.

N. PETERS, PHOTO-LITHOGRAPHER, WASHINGTON, D. C.

UNITED STATES PATENT OFFICE.

JOHN PRESTON, CHARLES W. TENNIS, AND JOEL B. HAMILTON, OF CLAYSVILLE, KENTUCKY.

IMPROVEMENT IN SEED-PLANTERS.

Specification forming part of Letters Patent No. 213,066, dated March 11, 1879; application filed June 22, 1878.

*To all whom it may concern:*

Be it known that we, JOHN PRESTON, CHARLES W. TENNIS, and JOEL B. HAMILTON, of Claysville, in the county of Harrison and State of Kentucky, have invented a new and valuable Improvement in Seed-Planters; and we do hereby declare that the following is a full, clear, and exact description of the construction and operation of the same, reference being had to the annexed drawings, making a part of this specification, and to the letters and figures of reference marked thereon.

Figure 9:
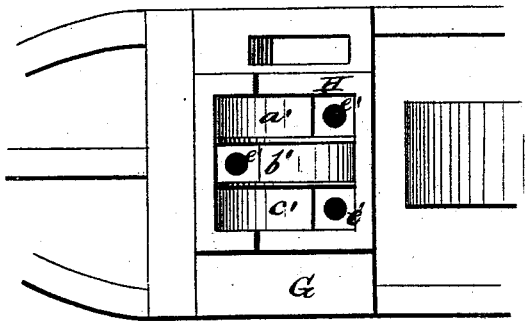
Figure 10:
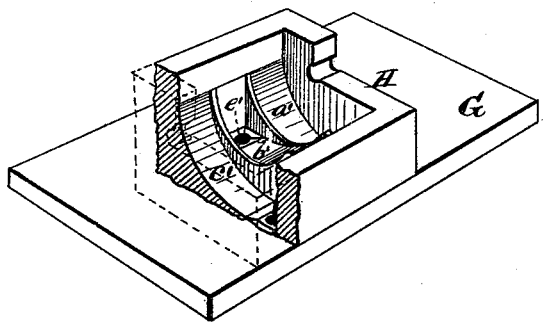

Figure 1 of the drawings is a representation of a longitudinal vertical central section of our seed-planters. Fig. 2 is a plan view. Fig. 3 is a sectional detail. Figs. 4 and 5 are perspective details. Figs. 6 and 7 are details. Fig. 8 is a perspective view of the lever. Fig. 9 is a plan view of the bottom of the hopper; and Fig. 10 is a sectional perspective of the bottom of the hopper, showing the curved bottoms of the compartments.

The nature of our invention consists in the construction and arrangement of a planter which can be used for planting any kind of seed and in as many rows at one time as desired, as will be hereinafter more fully set forth.

The annexed drawings, to which reference is made, fully illustrate our invention.

The main frame of our planter is composed of two parallel bars, A A, connected near the front, at the rear, and at or near the center by cross-bars B B, as shown. C is the tongue, pivoted between the front ends of the parallel bars A A.

On each side of the main frame is fastened a frame, D, which is constructed, as shown, of two parallel bars having their front ends bent or curved inward, and united together with a short bar in the center between them. In the rear part of each frame D is mounted a wheel or roller, E, and handles F F are braced and secured to each of said frames, as shown.

G is a platform secured on the frame D, said frame being fastened to the cross-bars B B of the main frame by bolts, so that it can be removed at will when required to use a single planter. On the platform G is a hopper, H, for containing the seed to be planted, and in the bottom of this hopper is a cylindrical dropper, I, secured upon a shaft, $a$. This cylinder or dropper may be formed with one, two, or three rows of dropping-holes, $f$, arranged at any desired distances apart. In a full-sized planter it is the intention to have a series of these droppers for each hopper, so as to have one for each kind of seed, and the dropper should be so connected to the shaft $a$ that it can be easily removed and another substituted when changing from one kind of seed to another. In the bottom of the hopper, below the dropper I, are three dropping-openings, $e'$, from which flexible conductors J lead to spouts K, formed on or attached to the rear of the colters L. The lower portion of the hopper H, below the dropper I, is divided into three compartments, $a'$ $b'$ $c'$, the two outer ones having concave bottoms curving from the front side at the upper edge of the lower section, $d'$, of the hopper H toward the rear side thereof, terminating in the line of the upper face of the platform G. The central compartment, $b'$, curves the reverse of the others, as shown. Each of the compartments communicates with dropping-opening $e'$, leading to a flexible conductor, J. The central hopper, H', is a modification of H, the only difference being that the compartments traverse it diagonally, to accommodate a dropper, I', having spiral flanges thereon.

In the hopper, and working against the dropper I, is a cut-off, $b$, for each row of holes in the dropper. This cut-off is simply a piece of rubber or leather fastened on the inside to the front of the hopper, with a flat metal spring, $d$, arranged behind the same in a groove in the hopper. The hopper H is, on the back, provided with an arm, $f^2$, the ends of which are caught under catches $e$ $e$ on the handles F F. At its front is a set-screw, $f^3$, passing through a strap, $g^2$, to secure the top of the hopper in place. The shaft $a$ is, on its outer end, provided with a pulley, $h$, which is, by a belt or chain, $i$, connected with a pulley, $k$, on the hub of the wheel or roller E, and thus the necessary rotary motion is imparted to the dropping mechanism. The inner end of one of the shafts $a$ is, by a suitable coupling, connected with another shaft, $a'$, having a dropper, $I'$, secured on it, said dropper working in a hopper, $H'$, on a platform, $G'$, which is secured on the two center bars, A A.

We have thus three hoppers with their dropping mechanisms, and each one has three conductors, spouts, and colters. The colter L is made of steel, and has its upper end or shank passing through the proper beam, there being slotted metal plates $n$ $n$ on top and bottom of the beams for the colter to pass through, and the colter may be adjusted up and down and fastened by a wedge or wedge-shaped key, $m$, inserted from the top. By moving this key from the front to the rear of the colter, and vice versa, the angle of the colter may be changed as desired.

The spout K, attached to the back of the colter, has its lower end made slightly flaring, as shown, and a short distance above the lower end, within the colter, is inserted a wedge-shaped block, $p$, fastened by a set-screw, $s$, which block causes the seed to scatter the width of the furrow, which, for many kinds of grain, is of great advantage.

Between the bars A A is placed a center bar, $A'$, through the front end of which is passed the stem M of a caster-wheel, N. On top of the stem M is swiveled a lever, O, the front end of which is, by a rod, $r$, connected to the front end of the bar $A'$. The rear end of the lever O is provided with a hook, $t$, so that the lever can be pressed down and fastened with said hook. This raises the entire frame-work of the machine, so that all the colters, &c., will be out of the ground, the machine being then moved upon the three wheels.

This planter as constructed can be used for any kind of seed, and the different frames can easily be disconnected, so as to use a single or double planter, as may be desired.

For dropping corn we dispense with the cylinders I $I'$ and use slides P, connected to and operated by a hand-lever, R, or arranged to be operated automatically in any of the known and usual ways.

What we claim as new, and desire to secure by Letters Patent, is—

1. In a seed-planter, the hopper H, the bottom of which has the compartments $a'$ $b'$ $c'$, having the curved bottoms, two of which curve in a direction opposite to the other, in combination with the dropper I and the flexible conductors J, having communication therewith through the openings $e'$, substantially as set forth.

2. In a seed-planter, the hopper H, having at its rear the arm $f$, engaging with the catches $e$ $e$ on the handles F F, and provided with the strap $g^2$ and set-screw $f^3$ at its front side, combined and operating substantially as and for the purposes set forth.

In testimony that we claim the above we have hereunto subscribed our names in the presence of two witnesses.

JOHN PRESTON.
CHARLES W. TENNIS.
JOEL B. HAMILTON.

Witnesses:
 JNO. R. POPE,
 JOHN W. BAGLEY.